United States Patent
Miyajima et al.

(10) Patent No.: US 8,478,491 B2
(45) Date of Patent: Jul. 2, 2013

(54) SEAT CONTROL DEVICE, METHOD, AND PROGRAM

(75) Inventors: Takayuki Miyajima, Anjo (JP); Koichi Hirota, Takahama (JP)

(73) Assignees: Aisin AW Co., Ltd., Anjo (JP); Aisin Seiki Kabushiki Kaisha, Kariya (JP)

( * ) Notice: Subject to any disclaimer, the term of this patent is extended or adjusted under 35 U.S.C. 154(b) by 402 days.

(21) Appl. No.: 12/656,187

(22) Filed: Jan. 20, 2010

(65) Prior Publication Data

US 2010/0191426 A1 Jul. 29, 2010

(30) Foreign Application Priority Data

Jan. 27, 2009 (JP) ................... 2009-015684

(51) Int. Cl.
*B60R 21/00* (2006.01)

(52) U.S. Cl.
USPC .......................................... 701/49

(58) Field of Classification Search
USPC ........................................ 701/49; 297/284.9
See application file for complete search history.

(56) References Cited

U.S. PATENT DOCUMENTS

| 2008/0109140 | A1 | 5/2008 | Hozumi et al. | |
| 2008/0119998 | A1* | 5/2008 | Hozumi et al. | 701/49 |
| 2008/0133092 | A1 | 6/2008 | Hozumi et al. | |
| 2010/0133885 | A1* | 6/2010 | Osaki | 297/311 |

FOREIGN PATENT DOCUMENTS

| CN | 101186190 A | 5/2005 |
| CN | 101177129 A | 5/2008 |
| JP | A 60-197436 | 10/1985 |
| JP | A 2008-114751 | 5/2008 |
| JP | A 2008-126822 | 6/2008 |
| WO | WO 2008133111 A1 * | 11/2008 |

OTHER PUBLICATIONS

Sep. 27, 2010 European Search Report issued in EP 10 00 0539.
Feb. 18, 2013 Chinese Search Report in CN 2009102606886.

* cited by examiner

*Primary Examiner* — James Trammell
*Assistant Examiner* — Jerrah Edwards
(74) *Attorney, Agent, or Firm* — Oliff & Berridge, PLC

(57) ABSTRACT

Devices, methods, and programs control a seat drive mechanism that drives side support parts of a seat. The devices, methods, and programs detect a first curve ahead of a vehicle and a second curve located ahead of the first curve with respect to a travel direction. The devices, methods, and programs predict a between-curves time required to travel between the first curve and the second curve and determine whether the between-curves time is less than a predetermined time, the predetermined time being no less than a time necessary for the side support parts to operate. The devices, methods, and programs control the seat drive mechanism to arrange the side support parts at an action position to support a body of an occupant for the first curve. If the between-curves time is less than the predetermined time, the devices, methods, and programs maintain the side support parts at the action position while traveling the second curve.

13 Claims, 9 Drawing Sheets

SEAT CONTROL DEVICE, METHOD, AND PROGRAM

INCORPORATION BY REFERENCE

The disclosure of Japanese Patent Application No. 2009-015684, filed on Jan. 27, 2009, including the specification, drawings and abstract thereof, is incorporated herein by reference in its entirety.

BACKGROUND

1. Related Technical Fields

Related technical fields include seat control devices, a seat control methods, and a seat control programs.

2. Related Art

Conventionally, a seat adjustment device is being proposed, which adjusts the position of side support parts of an automobile seat in a width direction of the seat. This seat adjustment device, to support an upper body of an occupant when a vehicle makes a turn or the like, drives the side support parts to make the upper body of the occupant abut thereon.

For example, Japanese Patent Application; Publication No. JP-A-2008-114751 discloses a device that drives the side support parts based on road shape. This device executes control that: acquires data relating to curves and straight sections ahead of a navigation system having electric map data with respect to a travel direction; determines a control start point and a control volume of the side support parts using a radius of a curve included in the acquired data, a lateral acceleration of the vehicle, and the like; and arranges the side support parts at a support position.

In addition, if there is a plurality of curves ahead of the vehicle with respect to the travel direction, this device determines the control volume of the side support parts of when traveling along the curves and the straight sections according to a distance between the respective curves. For example, if the distance of a straight section between curves is equal to or less than 50 m, the control volume of the side support parts of when traveling along the curves is maintained at the straight section. If the distance of the straight section is equal to or more than 150 m, the control is executed such that the control volume becomes "0" at the straight section.

SUMMARY

However, the before-mentioned device that does not consider a travel time at the straight section may give the occupant a hurried feeling. For example, even when it is determined to make the control volume "0" at the straight section between curves, if the travel speed of the vehicle is high, the travel time at the straight section becomes short. In that case, between the curves, an operation to retract the side support parts from the support position (a termination operation) may be discontinued and an operation to move the side support parts to the support position (a start operation) may be performed. Or, the control that starts the start operation immediately after the termination operation has completed may be executed. Both cases may give the occupant a hurried feeling. Furthermore, the timing when the side support parts are arranged at the support position may not match the timing when the side support should be arranged.

Exemplary implementations of the broad inventive principles herein provide a seat control device, a seat control method, and a seat control program that realize to enhance the usability also when traveling a plurality of curves in sequence.

Exemplary implementations provide devices, methods, and programs control a seat drive mechanism that drives side support parts of a seat. The devices, methods, and programs detect a first curve ahead of a vehicle and a second curve located ahead of the first curve with respect to a travel direction. The devices, methods, and programs predict a between-curves time required to travel between the first curve and the second curve and determine whether the between-curves time is less than a predetermined time, the predetermined time being no less than a time necessary for the side support parts to operate. The devices, methods, and programs control the seat drive mechanism to arrange the side support parts at an action position to support a body of an occupant for the first curve. If the between-curves time is less than the predetermined time, the devices, methods, and programs maintain the side support parts at the action position while traveling the second curve.

DETAILED DESCRIPTION OF EXEMPLARY IMPLEMENTATIONS

Figure 1:
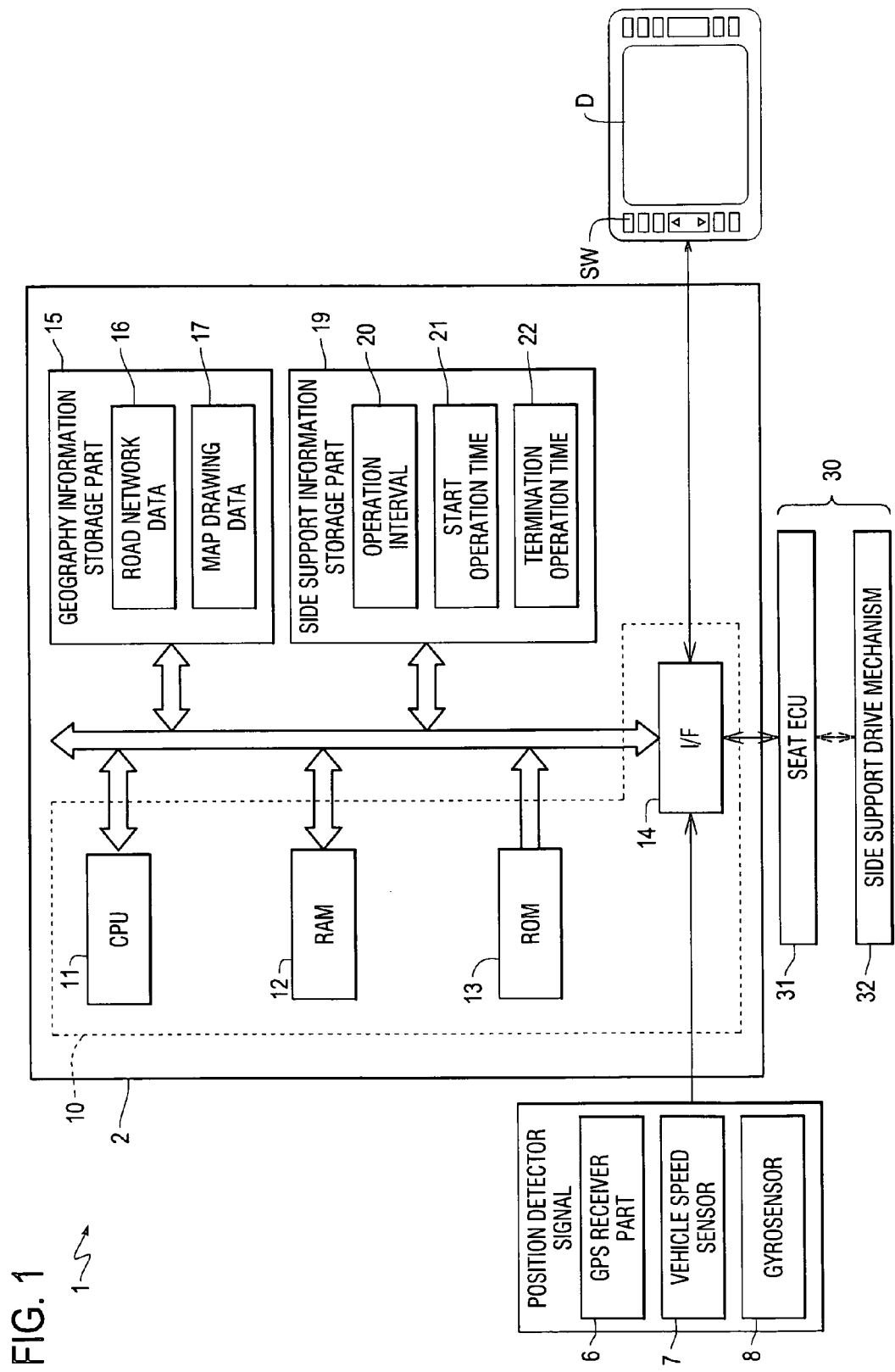
FIG. 1 is a block diagram of a seat control system.

FIG. 1 is a block diagram of a seat control system 1 that adjusts side support parts of a seat. In the seat control system 1, a navigation device 2 and a seat drive device 30 as a seat control device work in a coordinated manner to adjust the side support parts of the seat.

The navigation device 2 includes a navigation unit 10 structured with a controller (e.g., CPU 11), a RAM 12, a ROM 13, and an interface (I/F) 14. The navigation unit 10 stores a seat control program and corresponds to a curve detection unit, a between-curves time prediction unit, a between-curves time determination unit, a seat control unit, an operation interval time acquisition unit, a gradient information acquisition unit, an acceleration/deceleration acquisition unit, an action position acquisition unit, an operation necessary time calculation unit, a mark point setting unit, a control unit, and a seat control device.

The navigation unit 10 calculates a vehicle position based on a position detection sensor 5 installed in a vehicle. According to the present example, the position detection sensor 5 includes a GPS receiving part 6, a vehicle speed sensor 7, and a gyro sensor 8. The navigation unit 10 detects an absolute position of a latitude, a longitude, and the like by radio navigation based on the GPS receiving part 6. In addition, the navigation unit 10 calculates a relative position from a reference position by autonomous navigation based on the vehicle speed sensor 7 and the gyro sensor 8. And, the vehicle position is determined by combining the absolute position represented by the latitude and the longitude with the relative position.

In addition, the navigation device 2 includes a geography information storage part 15 configured by a hard disk or the like. The geography information storage part 15 stores road network data 16 having road information and map drawing data 17.

The road network data 16 is data including an identifier and a coordinate of a node and an identifier and a coordinate of a link. The node is a data element set to a terminal of an intersection or a road. The link is a data element set between respective nodes. In addition, the road network data 16 is associated with each link and includes a link cost set according to a link length, the number of lanes, and the like. The navigation unit 10 multiplies link costs corresponding to links from a current position to a destination by predetermined factors and totalizes these link costs to search for various kinds of recommended routes, for example, a route having a smallest total value. Further, the road network data 16 includes the number of lanes of each road, traffic classification of each lane, and the like.

The map drawing data 17, which is data for displaying a map screen on a display D connected to the navigation device 2, includes road shape data for drawing curve shape of roads and background data for drawing areas other than roads. The road shape data includes coordinates of shape interpolating points for indicating the curve shape of the roads. The shape interpolating points are set to between nodes according to the road shape. The navigation unit 10, in addition to the radio navigation and the autonomous navigation, performs map matching to compare a travel path of the vehicle with the road shape data and matches the vehicle position onto a road. If the travel path and the road shape data are largely deviated, the vehicle position is corrected.

In addition, the navigation unit 10 is connected with a seat ECU (Electronic Control Unit) 31 installed in the vehicle, and transmits and receives data for controlling the seat with the seat ECU 31. A seat drive device 30 that drives the side support parts of the seat is structured with the seat ECU 31 and a side support drive mechanism 32.

Figure 2:
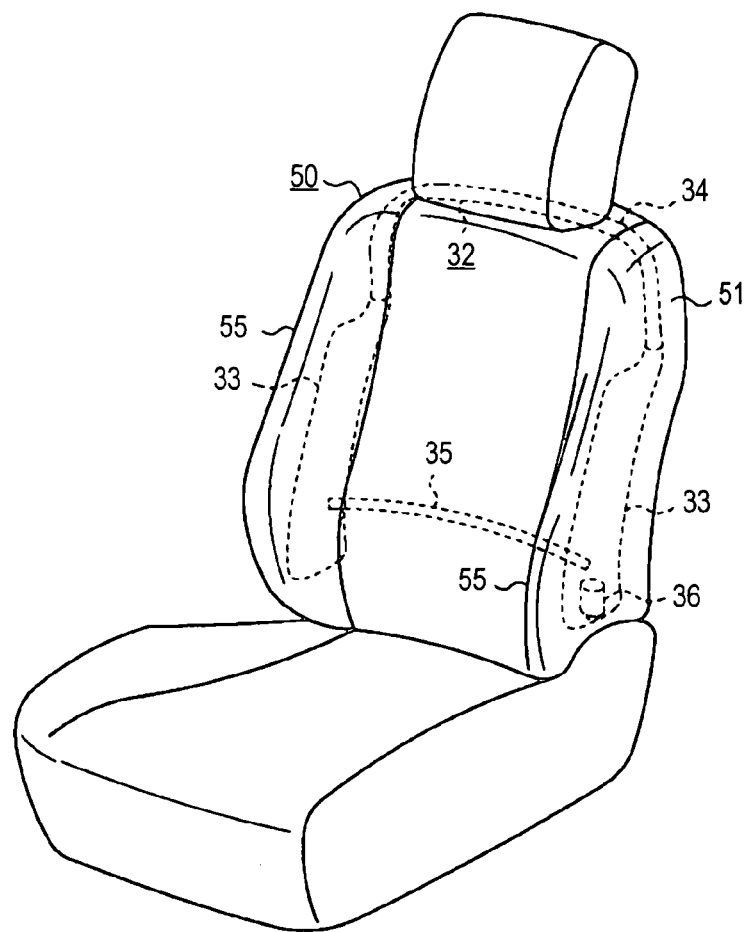
FIG. 2 is a schematic view of a seat mounted with a side support drive mechanism.
Figure 3:
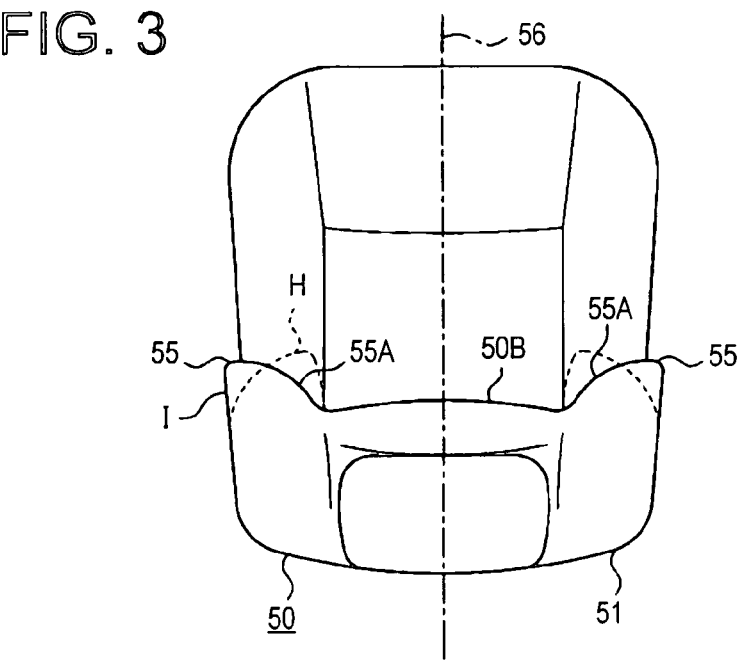
FIG. 3 is a plain view of the seat.

The side support drive mechanism 32 is mounted inside a seat 50 of the vehicle as shown in FIG. 2. The seat 50 mounted with the side support drive mechanism 32 includes side support parts 55 at both sides in a width direction of a seat back 51. The side support parts 55 support an upper body of an occupant from both sides. The side support parts 55 are formed as a whole in a forward-projected shape as shown in FIG. 3, and a seat surface side thereof is formed in a curved shape so as to continue into a center part 50B that supports the backside of the occupant. In addition, the seat 50 mounted with the side support drive mechanism 32 may be a driver seat, a front passenger seat, or a rear passenger seat, and not limited to a specific seat.

As shown in FIG. 2, the side support drive mechanism 32 includes an actuator 36 including a motor, a pair of side frames 33, a U-shaped frame 34, and a transmitting cable 35. The actuator 36 is connected to the transmitting cable 35 via a revolving mechanism (not shown) having a screw or the like. The revolving mechanism is connected to a side frame 33. In addition, the respective side frames 33 are connected to the frame 34 at the upper ends. The rotation of the screw driven by the actuator 36 is transmitted to the other side frame 33 via the transmitting cable 35. When the actuator 36 drives in a predetermined rotating direction, rotating force is converted by the revolving mechanism, and the side frames 33 revolve on a connecting part that connects to the frame 34 in a rough curving course toward an inner side of the side support drive mechanism 32. In addition, when the actuator 36 drives in a direction opposite to the above rotating direction, the side frames 33 revolve in a rough curving course from the inner side to an outer side.

In addition, the respective side frames 33 are installed at positions corresponding to the respective side support parts 55 of the seat 50. As described above, when the side frames 33 revolve toward the inner side, the side support parts 55 move from an open position I shown in solid line to a hold position H (an action position) shown in chain line in FIG. 3 (a start operation). In addition, when the side frames 33 revolve toward the outer side, the side support parts 55 move from the hold position H to the open position I (a termination operation). When the upper body of the occupant has inclined at a turn of the vehicle, the side support parts 55 at the open position I are capable of preventing the body from inclining more. On the other hand, the respective side support parts 55 at the hold position H are close each other facing a center line 56 of the seat 50, and the distance between inner surfaces 55A is shortened. For this reason, the side support parts 55 fit with the upper body of the occupant, enabling to firmly support the body of the occupant from both sides. Consequently, the side support parts 55 arranged at the hold position H can inhibit the occupant's movement in a lateral direction.

The navigation unit 10 determines a position where the side support parts 55 should be arranged based on the road shape; if there is for example a sharp curve with a small curvature ahead of the vehicle, moves the side support parts 55 to the hold position with a high support force; if there is no curve, moves the side support parts 55 to the open position. When adjusting the position of the side support parts 55 in this manner, the navigation unit 10 outputs to the seat ECU 31 a flag representing an ON status or an OFF status of each mode such as a stand-by mode, a hold mode, an operation mode.

The stand-by mode is a control mode for arranging the side support parts 55 at the open position I, for example, when traveling straight. The operation mode is a control mode for arranging the side support parts 55 at the hold position, for example, when traveling along a sharp curve. The hold mode, which is positioned between the stand-by mode and the operation mode, is a control mode for keeping the position corresponding to a mode set just before the hold mode, waiting for a timing to transit to the stand-by mode or the operation mode, and transitioning immediately to a desired mode at such timing. For example, in the case of a transition from the stand-by mode to the operation mode, the mode transits in a phased manner such as the stand-by mode to the operation mode via the hold mode. In the case of a transition from the operation mode to the stand-by mode, the mode transits such as from the operation mode to the stand-by mode via the hold mode.

In addition, as shown in FIG. 1, a side support information storage part 19 stores an operation interval time 20, a start operation time 21 and a termination operation time 22 as an operation necessary time. The operation interval time 20 is data, in which an interval between a termination operation and a start operation of the side support parts 55 is set, and can be set by the occupant.

Figure 4:
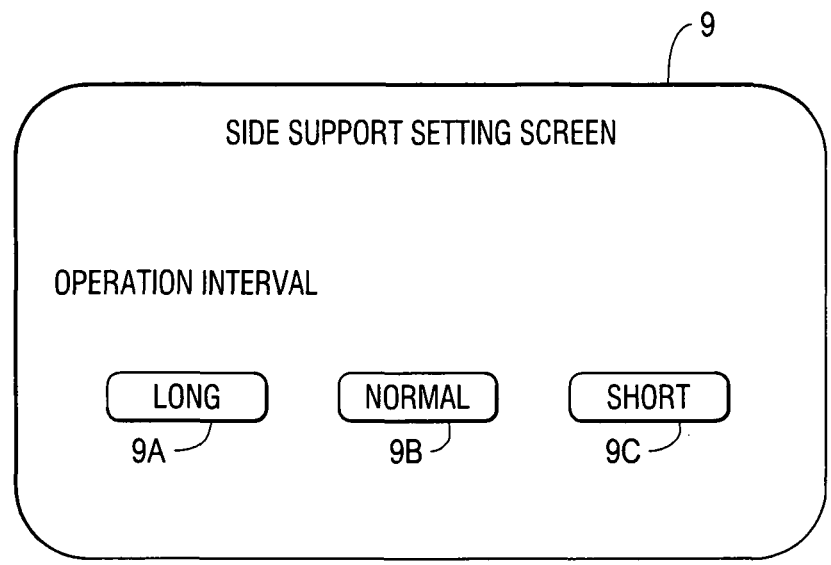
FIG. 4 is a screen view of a setting screen to set an operation interval.

For example, as shown in FIG. 4, the occupant sets an operation interval in a setting screen 9 displayed on the display D. In the setting screen 9, it is possible to set the operation interval time of the side support parts 55 long or short depending on the occupant's preference. For example, the occupant that feels discomfort about the operation of the side support parts 55 sets the operation interval time long. The occupant that does not feel discomfort about the operation of the side support parts 55 sets the operation interval time short. When setting the operation interval time long, the occupant selects an operation part 9A as "long" in the setting screen 9. When setting the operation interval time short, the occupant selects an operation part 9C as "short" in the setting screen 9. On the other hand, when setting the operation interval time medium, the occupant selects an operation part 9B as "normal."

The respective modes of the operation parts 9A to 9C as "long," "normal," and "short" are associated with the operation interval times that provide intervals between the respective operations. If "long" has been selected in the setting screen 9, the operation interval time 20 is set as "3 seconds" for example. If the operation part 9C as "short" has been selected, the operation interval time 20 is set as "1 second" for example. If the operation part 9B as "normal" has been selected, the operation interval time 20 is set as "2 seconds" for example.

In addition, the start operation time 21 and the termination operation time 22 stored in the side support information storage part 19 represent times required for the above start operation and termination operation of the side support parts 55 respectively. That is, the start operation time 21 represents the time to complete the start operation that the side frames 33 move from the open position to the hold position after driving the actuator 36. The termination operation time 22 represents the time to complete the termination operation that the side frames 33 move from the hold position to the open position after driving the actuator when the side frames 33 are at the hold position.

When there is a plurality of curves such as a first curve, a second curve and the like ahead of the vehicle, the operation interval time 20, the start operation time 21, and the termination operation time 22 are utilized for setting the position of the side support parts 55 between the curves.

When there are successive curves at short intervals such as a S-shaped curve or a speed of traveling between curves is high, after getting out of the first curve, if, immediately after the termination operation to move the side support parts 55 from the hold position to the open position has been performed, the start operation to move from the open position to the hold position for the next curve is performed, the operation becomes complicated and the operation of the side support parts 55 may give the occupant a hurried feeling. Or, between successive curves at short intervals, if the termination operation and the start operation for the next curve are performed, the termination operation may be discontinued and the start operation may be performed, or the start operation may start behind the target timing. If the termination operation is discontinued and the start operation is performed, not only the occupant may feel discomfort but also the side support parts 55 may not be arranged at the hold position at an appropriate timing. In addition, if the start operation starts behind the target timing, the timing to arrange the side support parts 55 at the hold position is delayed. Consequently, it may not be possible to support the occupant at an appropriate timing.

Here, it can be supposed to maintain the side frames 33 in the hold mode when the distance between curves is equal to or less than a predetermined distance. However, a travel time between curves depends on the vehicle speed. Therefore, if the vehicle speed is high, the operation may give the occupant a hurried feeling or the timing to arrange the side support parts 55 at the hold position may be delayed.

Consequently, in the present example, a required time Tr as a between-curves time, which is a time taken to travel between curves, is predicted, and it is determined whether or not the required time Tr is less than a total time of a time required to move the side support parts 55 and a time indicated by the operation interval time 20 (an operation interval time Tk). The time required to operate the side support parts 55 is a total time of a start operation time Ts and a termination operation time Te. As described before, in the present example, the times Ts and Te are basically constant; however, these may be changed according to a supply voltage of the side support drive mechanism 32 and a movement speed of the side support parts 55.

If the required time Tr is equal to or more than a total time Tt, it can be predicted that a time that the start operation time Ts and the termination operation time Te complete and the operation interval time Tk not to give the occupant a hurried feeling are secured when traveling between curves. That is, it is considered that the possibility to give the occupant a hurried feeling is low even when the termination operation and the start operation are performed between curves. Thus, in this case, the side support parts 55 are moved from the hold position to the open position, and then, moved from the open position to the hold position.

On the other hand, if the required time Tr is less than the total time Tt, the possibility that gives the occupant a hurried feeling is high if successively performing the termination operation and the start operation between curves, or it is even possible that the termination operation and the start operation do not complete between curves. Consequently, in this case, the side support parts 55 are maintained at the hold position.

Next, a processing of side support adjustment processing is described with reference to FIGS. 5 to 11. The processing may be implemented by the navigation CPU 11 executing a computer program stored in the RAM 12 and/or ROM 13, and/or another data storage device. But, even though the exemplary structure of the above-described navigation device 2 may be referenced in the description, it should be appreciated that the structure is exemplary and the process need not be limited by any of the exemplary structure.

Figure 5:
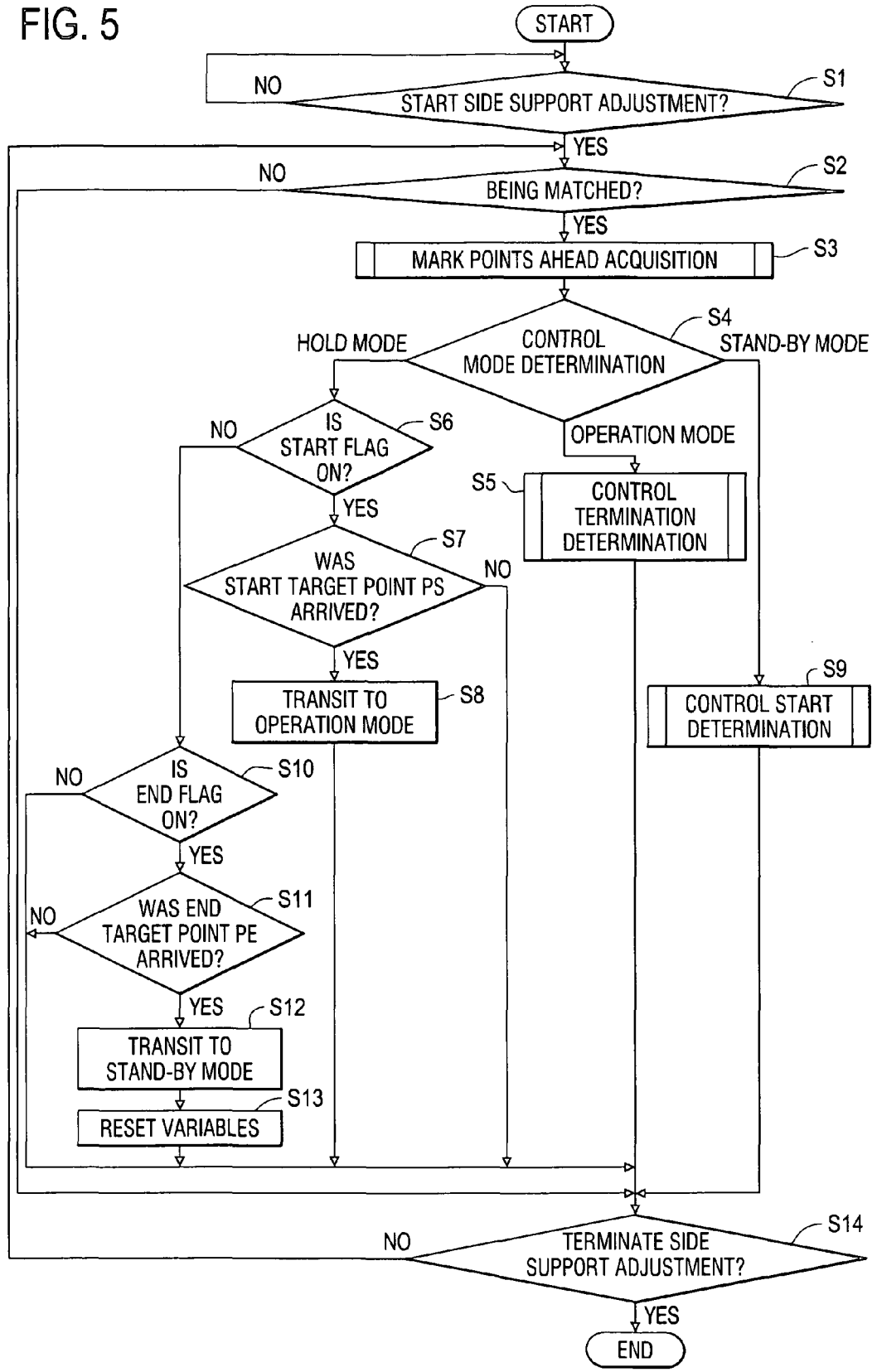
FIG. 5 is a flowchart of side-support adjustment processing.

First, as shown in FIG. 5, the navigation unit 10 determines whether or not to start the side support adjustment processing (Step S1). A trigger to start the side support adjustment processing is not specifically limited. It can be determined to start the side support adjustment processing, for example, when an ignition switch has turned on, when a switch SW (refer to FIG. 1) or the like has been operated, when the vehicle position is located at an area with a lot of curves such as a mountain area based on the map drawing data 17 and the like, or when a destination has been set.

When it has been determined to start the side support adjustment processing (Step S1: YES), it is determined whether or not the vehicle position is matched onto a road represented by the road shape data (Step S2). If not matched (Step S2: NO), the procedure goes to Step S14 and it is determined whether or not to terminate the side support adjustment processing. A trigger to terminate the side support adjustment processing is not specifically limited. It can be determined to terminate the side support adjustment processing, for example, when the ignition switch has turned off, when a predetermined switch SW or the like has been operated, when the vehicle position has gone off the area with a lot of curves such as a mountain area based on the map drawing data 17 and the like, or when the destination has been arrived.

If it has been determined that the vehicle position is matched (Step S2: YES), mark points ahead acquisition processing is performed (Step S3). Mark points include a start mark point Ps to start the start operation and an end mark point Pe to start the termination operation. In the mark points ahead acquisition processing, start mark points Ps and end mark points Pe in a predetermined range ahead of the vehicle are acquired.

Specifically, a road shape, which is based on the road shape data, in a predetermined range ahead of the vehicle position with respect to the travel direction is acquired. In the present example, the predetermined range is a distance from a point by a predetermined distance L1 ahead of the vehicle position to a point by a predetermined distance L2 (for example, 500 m) ahead. The predetermined distance L1 is set to a distance equal to or more than the distance (V·(Ts+Tk) acquired by multiplying a time Ts+Tk, which is acquired by adding the start operation time Ts and the termination operation time Te, by a vehicle speed V of when the processing is being performed (i.e., $L1 \geq V \cdot (Ts+Tk)$).

Figure 7:
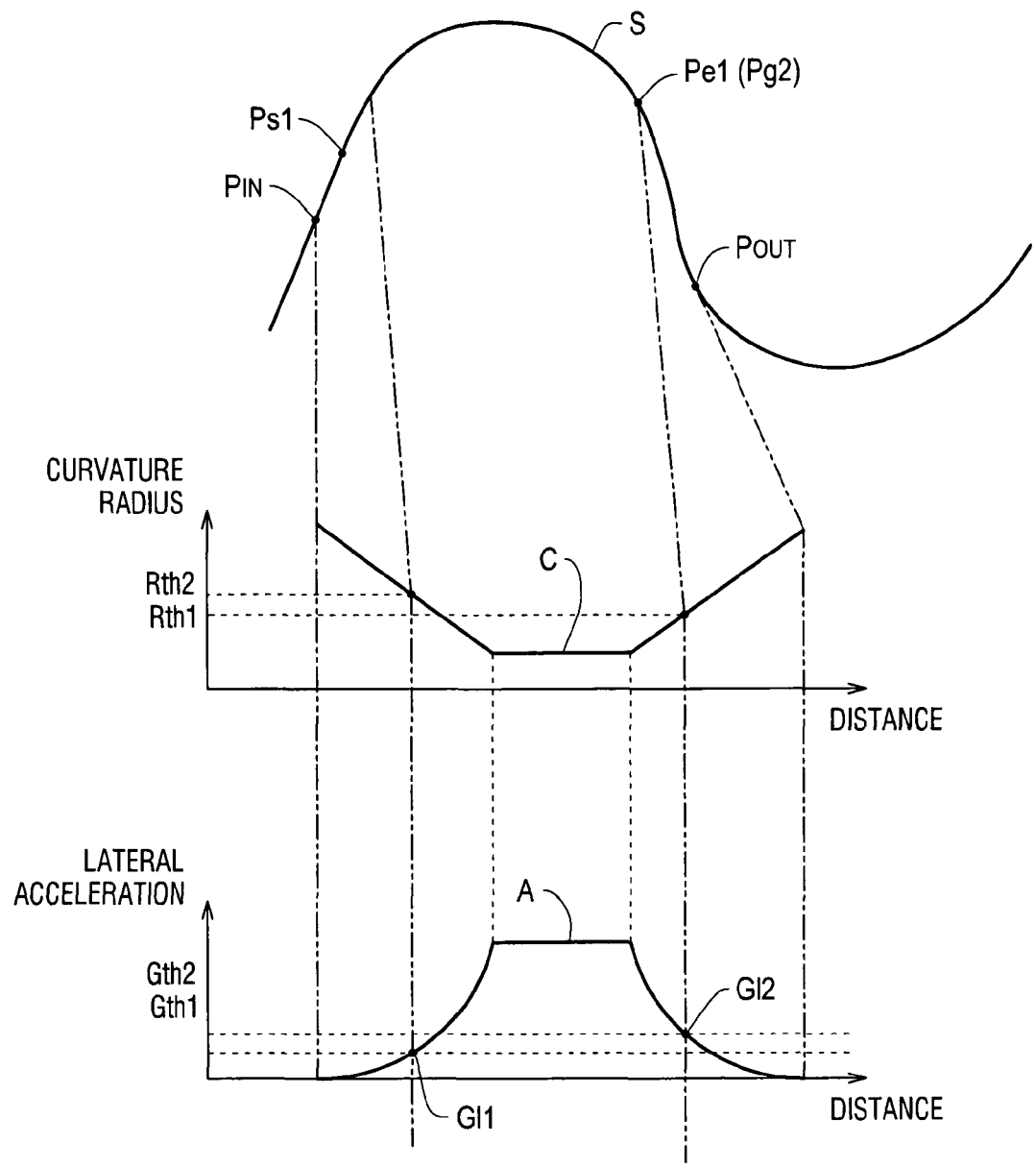
FIG. 7 is a schematic view showing a relation among a road shape, a curvature radius, and a lateral acceleration.

For example, as shown in a diagram of FIG. 7, when a road shape S is acquired, the road shape S is converted to a curvature variation line C representing a change of a curvature radius R. The curvature variation line C shown in FIG. 7 indicates a section from a curve entrance PIN where the curvature radius has become equal to or less than a predetermined value to a curve exit POUT where the curvature radius starts to be equal to or more than a predetermined value. A section where the curvature radius is extremely large such as a straight section where the curvature radius becomes infinite is not included.

In addition, the curvature variation line C is converted to a lateral acceleration curve A representing a change of a lateral acceleration Gl with use of a formula such as $G=V^2/R$ (G: Acceleration in a distal direction, V: Vehicle speed, R: Curvature radius). The vehicle speed V is the speed of the vehicle of when the processing is being performed.

When the lateral acceleration curve A is acquired, all start points Gl1 where the lateral acceleration Gl starts to be equal to or more than a first threshold value Gth1 (a first reference value), which is a reference to start supporting by the side support parts 55, are detected on the lateral acceleration curve A. For example, on the lateral acceleration curve A representing a change of the lateral acceleration Gl in the above-mentioned predetermined range, the points where the lateral acceleration Gl becomes the first threshold value Gth1 are detected, and the change volume of the lateral acceleration Gl from the respective points to points shifted to a direction going away from the vehicle position with respect to the travel direction is acquired. And, points where the change volume of the lateral acceleration Gl starts to increase are determined as the start points Gl1. The first threshold value Gth1 is set to a lateral acceleration at which the occupant starts to notice centrifugal force such as 1.5 G.

When all start points Gl1 on the lateral acceleration curve A are acquired, all start mark points Ps corresponding to the respective start points Gl1 as a reference are determined. For example, a distance L3 is acquired by multiplying the start operation time Ts by the vehicle speed V of when the processing is being performed (L3=Ts·V), and points by the distance L3 moved from the start points Gl1 in a direction opposite to the travel direction, i.e., in a direction approaching the current vehicle position is set as the start mark points Ps. Thus, if the start operation is started at a time when the vehicle has arrived at the start mark points Ps, the side support parts 55 can be arranged at the hold position at just the moment when the lateral acceleration Gl becomes equal to or more than the first threshold value Gth1. The start mark point Ps is calculated based on the lateral acceleration predicted according to the road shape; therefore, the start mark point Ps is not always the same position as the curve entrance PIN. In this manner, when all of n start mark points Ps1, Ps2, . . . Ps (n) are determined for the respective start points Gl1, the coordinates of the respective start mark points are stored in a sequence order according to the travel direction in the RAM 12. In addition, if any curve is not detected in the predetermined range, the start mark point Ps is not determined.

The navigation unit 10 detects start points Gl2 where the lateral acceleration Gl starts to be equal to or less than a second threshold value Gth2 (a second reference value), which is a reference to terminate control. The second threshold value Gth2 is set to a value equal to or more than the first threshold value Gth1 such as 2.0 G.

When all start points Gl2 on the lateral acceleration curve A are acquired, all of the respective start points Gl2 are determined as the end mark points Pe. In this manner, n end mark points Pe1, Pe2 . . . Pe (n) are acquired, and the coordinates of the end mark points Pe are stored in the order according to the travel direction in the RAM 12.

In acquiring the road shape, if the coordinate of each point set on a road at regular intervals have been acquired, the curvature radius R at each point may be calculated and the lateral acceleration Gl of each point may be calculated based on the curvature radius R and the vehicle speed V of when the processing is being performed. Then, based on the lateral acceleration Gl, the coordinates of the start mark points Ps and the end mark points Pe may be acquired in the same procedure as described above.

Figure 8:
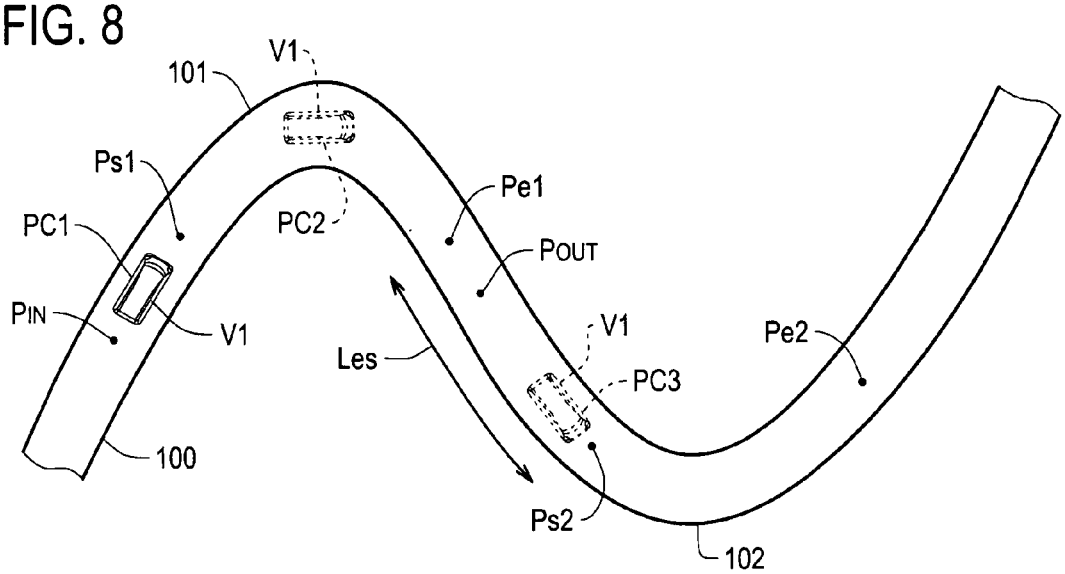
FIG. 8 is a schematic view of a road having consecutive curves.

In this manner, when the mark points ahead of the vehicle are acquired, the procedure goes to Step S4, and the control mode is determined. As shown in FIG. 8, when the vehicle position is located at a before-curve position PC1 before entering the first curve ahead of the vehicle, the control mode is determined as the stand-by mode and the processing of a control start determination is performed (Step S5).

Figure 6:
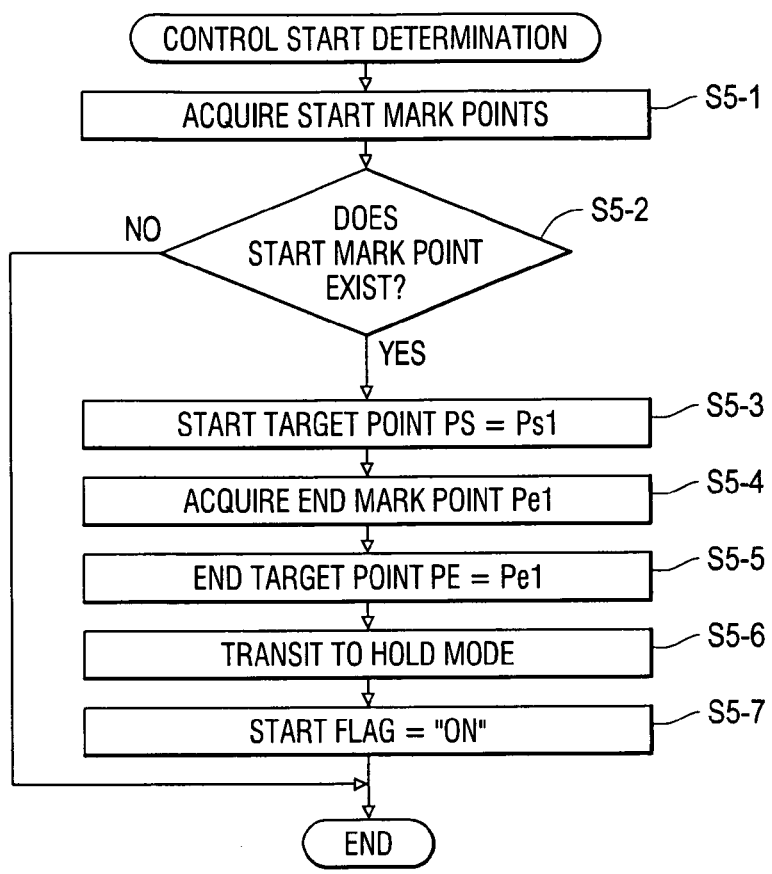
FIG. 6 is a flowchart of a control start determination.

The control start determination is described with reference to FIG. 6. First, the navigation unit 10 acquires the respective start mark points Ps acquired at Step S3 and stored in the RAM 12 (Step S5-1), and determines whether or not the start mark point Ps1 in the predetermined distance L1 exists among the acquired respective start mark points Ps. (Step S5-2).

For example, when any curve does not exist in the predetermined range ahead of the vehicle and it is determined that the start mark point Ps1 in the predetermined distance L1 ahead of the vehicle does not exist (Step S5-2: NO), the control start determination is terminated and the procedure goes to Step S14 shown in FIG. 5.

When a curve exists in the predetermined range ahead of the vehicle and it is determined that the start mark point Ps1 in the predetermined distance L1 ahead of the vehicle exists (Step S5-2: YES), if the start mark point Ps1 is located in a predetermined distance L4 from the vehicle position, such start mark point Ps1 is determined as a start target point PS representing a closest point that is target for performing the start operation (Step S5-3).

When the start target point PS is determined, the end mark point Pe1 that is located next to the start target point PS is acquired (Step S5-4). Further, the acquired end mark point Pe1 is determined as an end target point PE (Step S5-5). The end target point PE is a closest point that is target for performing the termination operation.

When the end target point PE is determined, the control mode transits from the stand-by mode to the hold mode (Step S5-6). In addition, a start flag stored in the RAM 12 or the like is set to "ON" (Step S5-7). The start flag is a flag for transitioning from the hold mode to the operation mode and set to "ON" before passing the start target point PS.

In this manner, when transitioning to the hold mode, the procedure goes to Step S14 shown in FIG. 5 and it is determined whether or not to terminate the side support adjustment processing. When it is determined not to terminate the side support adjustment processing (Step S14: NO), the procedure returns to Step S2. The side support adjustment processing is repeated every several ten milliseconds to several hundred milliseconds. Therefore, a vehicle V1 is still at the before-curve position PC1 that is in front of the start mark point Ps1 at this moment.

After the control mode has set to the hold mode, Steps S2 to S4 are performed. When it is determined the control mode is the hold mode, the procedure goes to Step S6. At Step S6, it is determined whether or not the start flag is "ON." When it is determined that the start flag is "ON" (Step S6: YES), the procedure goes to Step S7. When it is determined that the start flag is "OFF" (Step S6: NO), the procedure goes to Step S10, which is described later.

At Step S7, it is determined whether or not the vehicle has arrived at the start target point PS. If the vehicle is located before the start target point PS set at Step S5-3, it is determined that the vehicle has not arrived at the start target point PS (Step S7: NO). Then, the procedure goes to Step S14. Consequently, until the vehicle arrives at the start target point PS since the start flag has been set to "ON," the control mode is repeatedly determined and maintained in the hold mode.

When the vehicle arrives at the start target point PS (Step S7: YES), firstly, the start flag is changed from "ON" to "OFF." Then, the control mode transits from the hold mode to the operation mode (Step S8). When transitioning to the operation mode, the navigation unit 10 transmits to the seat ECU 31 the flag indicating the operation mode set to "ON." When receiving the flag, the seat ECU 31 drives the actuator 36 to start moving the side support parts 55 from the open position to the hold position.

In this manner, when transitioning to the operation mode, the procedure goes to Step S14 shown in FIG. 5 and it is determined whether or not to terminate the side support adjustment processing. When it is determined not to terminate the side support adjustment processing (Step S14: NO), the procedure returns to Step S2.

Then, Steps S2 to S4 are performed again. When it is determined that the control mode is the operation mode at Step S4, a control termination determination is performed (Step S9).

Figure 10:
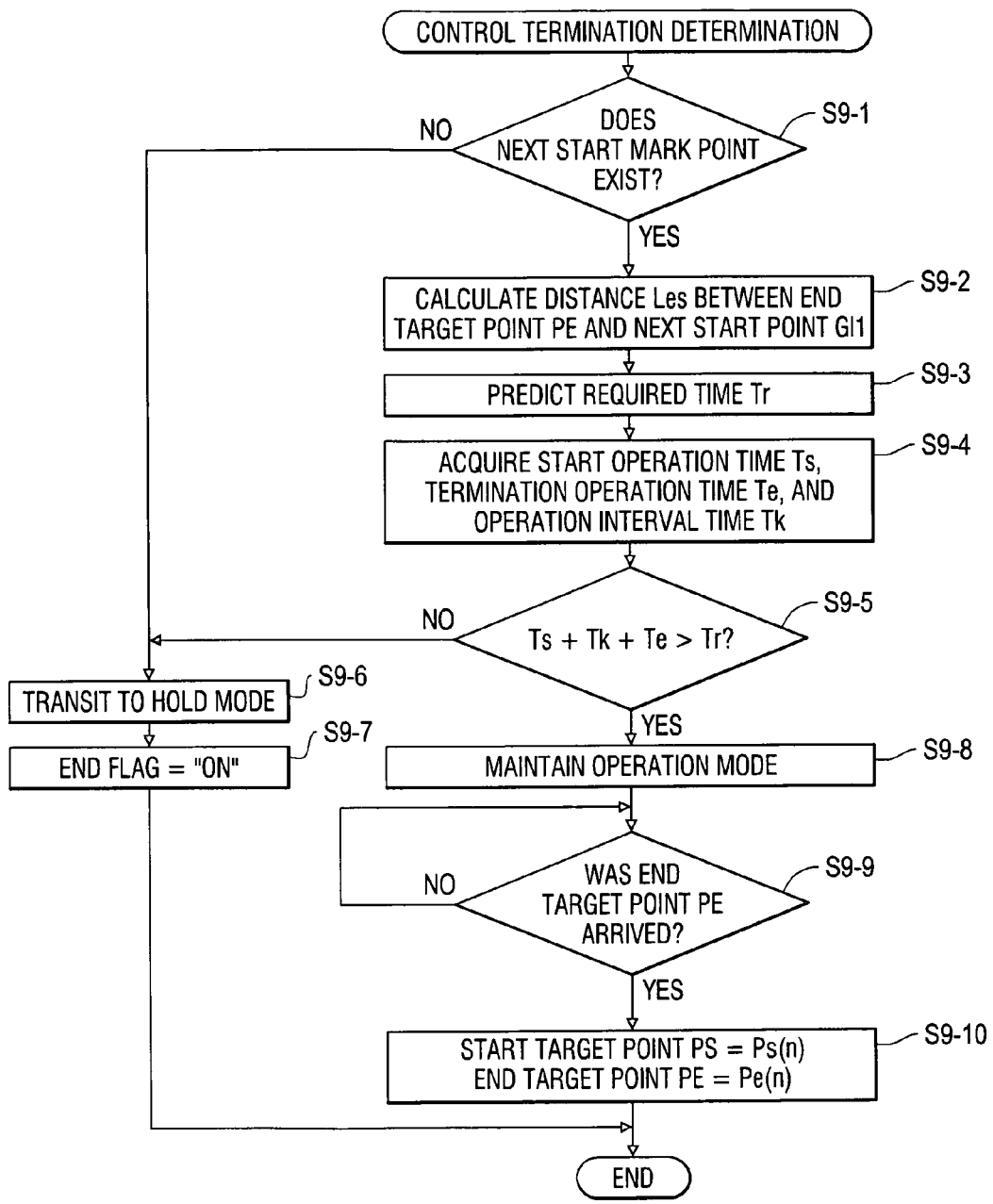
FIG. 10 is a flowchart of a control termination determination.

The control termination determination is described with reference to FIG. 10. The control termination determination is performed after the vehicle V1 has passed the start target point PS (the start mark point Ps1), and the vehicle V1 is located at a position in the curve of the first curve PC2 (refer to FIG. 8). The navigation unit 10 determines whether or not the next start mark point Ps2 exists based on the mark points acquired at Step S3 (Step S9-1). "The next start mark point Ps2" at this step is the start mark point Ps2 that is located next to the start mark point Ps1, which has been determined as the start target point PS, among the previously-determined start mark points, and a mark point that is located next to the end target point PE (the end mark point Pe1).

First, a case where the vehicle is traveling along a single curve section that does not include consecutive curves is described. If there is not a curve next to the curve where the vehicle is traveling in the predetermined range ahead of the vehicle, it is determined that the next start mark point Ps2 does not exist (Step S9-1: NO), and the control mode transits from the operation mode to the hold mode (Step S9-6). When transitioning to the hold mode, an end flag is set to "ON" (Step S9-7). The end flag is set to "ON" after passing the start target point PS before arriving at the end target point PE. The end flag is a flag for transitioning from the hold mode to the stand-by mode. When the end flag is set to "ON," the procedure goes to Step S14 shown in FIG. 5. When it is determined not to terminate the side support adjustment processing at Step S14 (Step S14: NO), Steps S2 to S4 are performed and the procedure goes to Step S6 because the control mode is hold mode. At Step S6, the start flag is "OFF" (Step S6: NO); therefore, the procedure goes to Step S10 and it is determined whether or not the end flag is "ON." When it is determined that the end flag is "ON" (Step S10: YES), it is determined whether or not the vehicle has arrived at the end target point PE that is being set at the moment (Step S11).

If the vehicle has not arrived at the end target point PE (Step S11: NO), the procedure goes to Step S14. Until the vehicle arrives at the end target point PE, the control mode is maintained in the hold mode and the determination of the control mode is repeated. When it is determined that the vehicle has arrived at the end target point PE (Step S11: YES), firstly, the end flag is set to "OFF." Then, the control mode transits from the hold mode to the stand-by mode, and the flag indicating the hold mode set to "OFF" is transmitted to the seat ECU 31. When receiving the flag, the seat ECU 31 drives the actuator 36 to start moving the side support parts 55 from the hold position to the open position (Step S12). Then, variables such as the start target point PS and the end target point PE are reset (Step S13).

Figure 9:
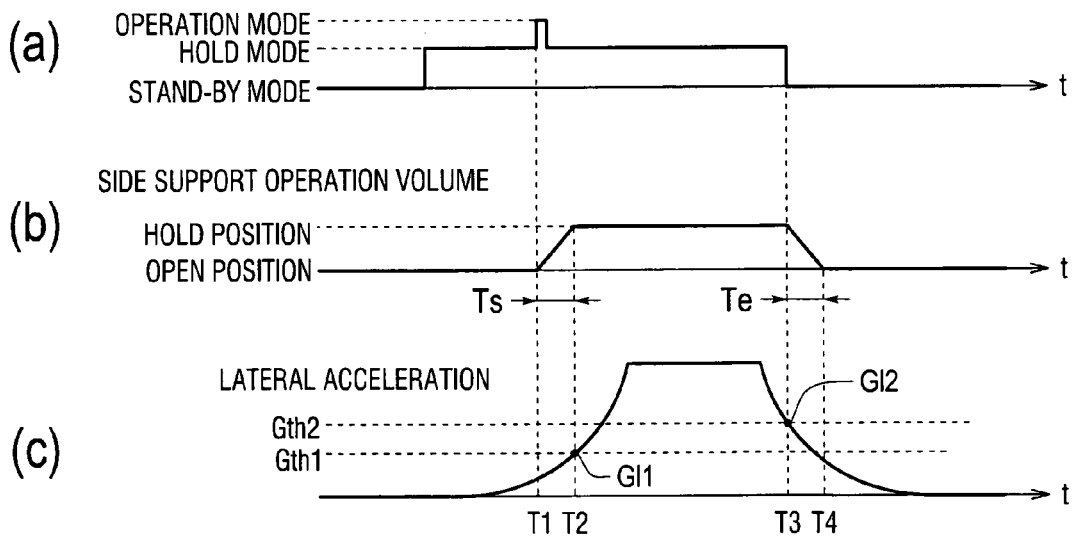
FIG. 9 shows timing charts showing (a) a transition of control modes, (b) a change of an operation volume, and (c) a change of a lateral acceleration toward a single curve.

FIGS. 9A, 9B and 9C show a relation between position changes of the side support parts 55 and the control mode in the case of traveling along the single curve section. When the actuator 36 starts driving at a time T1 when the vehicle has arrived at the start target point PS and the control mode has changed from the hold mode to the operation mode as shown in FIG. 9, an operation volume from the open position of the side support parts 55 gradually increases toward the hold position as shown in FIG. 9. The operation volume of the side support parts 55 increases as the distance between the inner surfaces 55A of the side support parts 55 decreases.

At a time T2 when the start operation time Ts has passed from the time T1 when the actuator 36 started driving, the lateral acceleration Gl reaches the first threshold value Gth1 as shown in FIG. 9, and the side support parts 55 are adjusted at the hold position and fitted with the upper body of the occupant as shown in FIG. 9. Therefore, it is possible to support the occupant from both sides when the lateral acceleration Gl has reached the first threshold value Gth1.

Further, as it is detected that the next start mark point Ps2 does not exist at the above Step S9-1 immediately after the control mode has been set to the operation mode, the control mode is changed from the operation mode to the hold mode as shown in FIG. 9. In this hold mode, the side support parts 55 are arranged at the hold position as shown in FIG. 9.

Then, at a time T3 when the vehicle arrived at the end target point PE, the control mode is set to the stand-by mode as shown in FIG. 9, and the actuator 36 starts driving in a direction opposite to that of the start operation. The side support parts 55 start to move from the hold position to the open position and the operation volume gradually decreases as shown in FIG. 9. At a time T4 when the termination operation time Te has passed from the time T3, the side support parts 55 are arranged at the open position.

Next, the control termination determination when the vehicle is traveling along a complex curve section that includes consecutive curves is described. At this moment, the vehicle is positioned at in-curve position PC2.

At Step S9-1, when it is determined that the next start mark point Ps2 exists (Step S9-1: YES), a distance Les between the end target point PE and the start point Gl1 corresponding to the next start mark point Ps (n) that was detected at Step S9-1 is calculated (Step S9-2). "n" of "the start mark point Ps (n)" indicates the sequence order in the travel direction of the respective start mark points acquired at Step S3. For example, if the start mark point acquired secondly has been detected, "n" is "2."

In calculating the distance Les, the distance Les between the end target point PE (the end mark point Pe1) for a first curve 101 and the second start point Gl1 is calculated based on the road shape S acquired at Step S2. Further, the acquired distance Les is divided by the vehicle speed V of when the processing is being performed to predict the required time Tr to travel between the curves (Step S9-3).

When the required time Tr is predicted, the start operation time Ts, the termination operation time Te, and the operation interval time Tk are acquired from the side support information storage part 19 (Step S9-4). Further, it is determined whether or not the required time Tr calculated at Step S9-3 is less than a total time of the start operation time Ts, the termination operation time Te, and operation interval time Tk (Step S9-5).

For example, if the distance Les representing the distance of between the consecutive curves is long, or if it is predicted that the speed of the vehicle traveling between the curves is low, the required time Tr is likely to be longer than the above total time. If the required time Tr is equal to or more than the above total time (Step S9-5: NO), it is predicted not to give the occupant a hurried feeling even when the termination operation and the start operation are performed between the curves. Therefore, the control mode transits from the operation mode to the hold mode (Step S9-6), the end flag is set to "ON" (Step S9-7) and the procedure goes to Step S14 shown in FIG. 5. When it is determined not to terminate the support adjustment processing (Step S14: NO), Steps S2-4 are repeated. At Step S4, it is determined that the control mode is the hold mode, the procedure goes to S6. At Step S6, it is determined that the start flag is "OFF" (Step S6: NO) and the procedure goes to Step S10. At Step S10, it is determined that the end flag is "ON" (Step S10: YES) and the procedure goes to Step S11. Then, when the vehicle arrives at the end target point PE (Step S11: YES), the control mode transits to the stand-by mode (Step S12), and the variables are reset (Step S13).

In this manner, when it is determined that the required time Tr to travel between curves is equal to or more than the above total time, at least the start operation time and the termination operation time of the side support parts 55 are secured. Consequently, even when the start operation and the termination operation are performed, it is possible to inhibit cases where the termination operation is discontinued and the start operation is performed or where the side support parts 55 are not being arranged at the hold position although the start point Gl1 for the next curve was arrived. In addition, by including the operation interval time Tk set by the occupant in the above total time, it is possible not to give the occupant the hurried feeling by the operation of the side support parts 55.

On the other hand, at Step S9-5, if the required time Tr is less than the total time of the start operation time Ts, the termination operation time Te, and the operation interval time Tk (Step S9-5: YES), the operation mode is maintained (Step S9-8). That is, if the required time Tr is less than the above total time, it is highly likely to give the occupant a hurried feeling. Further, there is a possibility that the start operation of the side support parts 55 does not start when arriving the next start mark point Ps2. Consequently, in such case, the operation mode is kept between curves and the side support parts 55 are maintained at the hold position.

When it is determined that the operation mode is maintained in such manner, the procedure goes to Step S9-9 and an arrival at the end target point PE is waited. When the end target point PE was arrived (Step S9-9), the start target point PS and the end target point PE at that moment are reset and the start target point PS and the end target point PE for a neighboring curve located ahead in the travel direction are set. For example, in setting the start target point PS and the end target point PE for the second curve, the coordinate of the next start mark point Ps2 detected at Step S9-1 is stored as the start target point PS. In addition, the coordinate of the end mark point Pet corresponding to the start mark point Ps2 is stored as the end target point PE.

When the start target point PS and the end target point PE have been set for the above neighboring curve, the control termination determination is performed again because the operation mode is maintained. At Step S9-1, it is determined whether or not the next start mark point Ps3 for the third curve exists. If the third curve does not exist and the next start mark point Ps3 is not detected (Step S9-1: NO), the control mode transits from the operation mode to the hold mode (Step S9-6) and the end flag is set to "ON" (Step S9-7). And, at Step S11 shown in FIG. 5, when it is determined that the end target point PE was arrived (Step S11: YES), the control mode transits from the hold mode to the stand-by mode (Step S12), and the variables are reset (Step S13).

On the other hand, at Step S9-1, if the third curve exists and the next start mark point Ps3 has been detected (Step S9-1: YES), the same processing as the control termination determination for the above second curve is performed. Thereafter, the control termination determination is repeated as long as curves continue.

Figure 11:
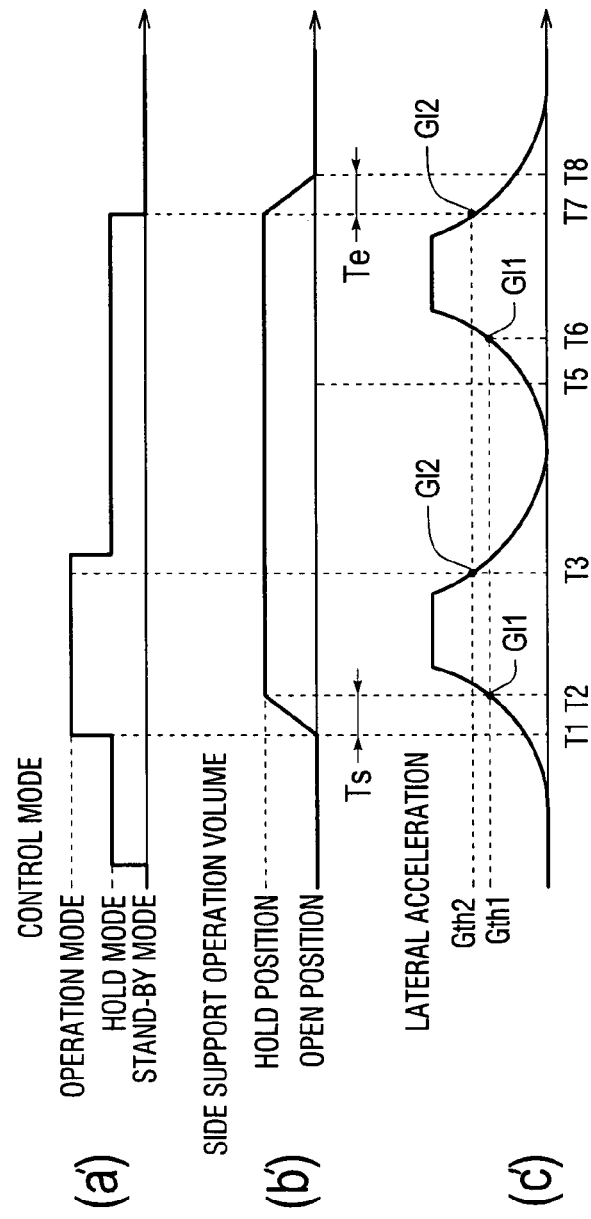
FIG. 11 shows timing charts showing (a') a transition of control modes, (b') a change of an operation volume, and (c') a change of a lateral acceleration toward a complex curve.

FIGS. 11A, 11B and 11C show a relation between position changes of the side support parts 55 and the control mode in a case where two curves continue. As shown in FIG. 11, at the time T1 when the start mark point Ps1 for the first curve has been passed, the control mode transits from the hold mode to the operation mode. And, the operation mode is maintained till immediately after the time T3 when the end mark point Pe1 for the first curve was arrived.

When the end mark point Pe1 for the first curve was passed, the second start mark point Ps2 and the end mark point Pe2 are set as the start target point PS and the end target point PE and the presence or absence of the start mark point Ps3 for the third curve is determined. When it is determined that the start mark point Ps3 for the third curve does not exist, the control mode transits from the operation mode to the hold mode as shown in FIG. 11. Then, the hold mode is maintained till a time T7 when the end target mark point Pe2 for the second curve was arrived. Further, after passing the time T7 when the end mark point Pe2 for the second curve was arrived, the control mode transits from the hold mode to the stand-by mode.

As shown in FIG. 11, when the control mode transits from the hold mode to the operation mode at the time T1, the operation volume of the side support parts 55 increases from the open position to the hold position. At the time T2 when the start operation time Ts has passed from the time T1, the side support parts 55 are arranged at the hold position. Then, from the time T2 through to the time T7 when the control mode transits from the hold mode to the stand-by mode, the side support parts 55 are maintained at the hold position. Then, when the time T7 has passed, the side support parts 55 start to move from the hold position to the stand-by position. When the termination operation time Te has passed from the time T7, the side support parts 55 are arranged at the stand-by position.

If it is determined that the required time Tr to travel between curves is less than the above total time, the control mode is maintained in the operation mode to keep the side support parts 55 arranged at the hold position. In this manner, it is possible not only to inhibit the hurried feeling that is given by the operation of the side support parts 55, but also to prevent a case where the operation is discontinued or the start operation is not started at the start mark point Ps. Consequently, the reliability and the usability of the device can be improved. Further, for the above total time, the occupant can set the operation interval time Tk; therefore, the operation interval can be the one according to the occupant's preference. Thus, it is possible to more surely inhibit the hurried feeling that is given by the operation of the side support parts 55.

According to a first example, the following effects or the like can be produced.

(1) According to the above example, the navigation unit 10 detects the first curve ahead of the vehicle and the second curve following the first curve. If consecutive curves of the first curve and the second curve exist, the required time Tr to travel between the curves is predicted. Further, it is determined whether or not the required time Tr is less than the total time of the start operation time, the termination operation time, and the operation interval time Tk. If the required time Tr is less than the total time, the side support parts 55 arranged at the hold position for the first curve are maintained at the hold position between the first curve and the second curve. Therefore, if the time taken to travel between curves is short, by maintaining the side support parts 55 at the hold position between the curves, it is possible to inhibit the hurried feeling that is given by the operation of the side support parts 55. In addition, it is possible to surely arrange the side support parts 55 at the hold position at a moment when the side support parts 55 should be arranged at the hold position. Consequently, the usability of the seat control system 1 can be enhanced.

(2) According to the above example, the navigation unit 10 acquires the operation interval time 20 that was previously set by the occupant. In addition, it is determined whether or not the required time Tr to travel between curves is less than the total time including the start operation time Ts, the termination operation time Te, and the operation interval time Tk set by the occupant. Consequently, the operation interval time Tk can be the time according to the occupant's preference; therefore, it is possible to more surely inhibit the hurried feeling that is given by the operation of the side support parts 55.

(3) According to the above example, the navigation unit 10 predicts the lateral acceleration Gl of the vehicle of when traveling along the curves based on the above road shape data and the like and determines the start mark points Ps to start driving the side support parts 55 based on the start points where the lateral acceleration Gl becomes equal to or more than the first threshold value Gth1. In addition, the navigation unit 10 determines the end mark points Pe to terminate driving the side support parts 55 based on the start points where the lateral acceleration Gl becomes equal to or less than the second threshold value Gth2. The distance Les between the end mark point Pe for the first curve and the start point Gl1 for the second curve is acquired, and the required time Tr is calculated based on the distance Les and the vehicle speed. In this manner, the required time Tr can be calculated more accurately; therefore, the reliability of the device can be further improved. In addition, as the start mark points Ps and the end mark points Pe are calculated based on the road shape data, the start operation starts for example before the start point Gl1 at which the occupant starts to notice the lateral acceleration (the centrifugal force), and the side support parts 55 can be arranged at the hold position when the lateral acceleration Gl has become the first threshold value Gth1. Consequently, the side support parts 55 can be arranged at the hold position with right timing.

II. Second Example

Next, a second example is described. In the this example, only a part of the processing of the first example is changed. Therefore, detailed explanation for the other parts is omitted.

In the second example, the operation interval time Tk is set according to a gradient and an acceleration/deceleration.

If the operation interval time Tk is set according to the gradient, for example, the operation interval time 20 stored in the side support information storage part 19 is utilized as a reference time and the reference time is corrected according to the gradient. In this case, the navigation unit 10 acquires gradient information corresponding to a section between curves ahead (a between-curves section) from the map drawing data 17 or the like. The gradient information indicates presence or absence of an up-grade and a down-grade, an altitude, an actual gradient value, or the like. Further, based on a previously-stored gradient-coefficient map, a coefficient K1 corresponding to the acquired gradient information is acquired. In the gradient-coefficient map, a positive coefficient that is less than "1" (for example, 0.8) is set for the up-grade and a positive coefficient that is equal to or more than "1" (for example, 1.5) is set for the down-grade. If the gradient information includes small and large of a gradient for the up-grade, the coefficient K1 is set smaller as the gradient increases.

In addition, the navigation unit 10 reads out the operation interval time 20 stored in the side support information storage part 19. By multiplying a reference time Tst that the operation interval time 20 indicates by the acquired coefficient K1, the operation interval time Tk is calculated (Tk=K1·Tst). As a result, the operation interval time Tk is corrected to be short for the up-grade. That is, in the case of the up-grade, the speed is likely to decrease. If the speed decreases, it is predicted that necessity of holding by the side support parts 55 decreases; therefore, the operation interval time Tk can be set short. On the other hand, the operation interval time Tk is corrected to be long for the down-grade. That is, if the speed is likely to increase at the down-grade, it is predicted that the necessity of holding by the side support parts 55 increases; therefore, the operation interval time Tk is set long to maximize the possibility that the side support parts 55 are maintained at the hold position.

Or, as a method to set the operation interval time Tk according to the gradient, the operation interval time Tk may be directly acquired using a gradient-operation interval map based on the acquired gradient information. In the gradient-operation interval map, the gradient and the operation interval time Tk are associated and set. A short operation interval time Tk is set for the up-grade compared to the down-grade. A long operation interval time Tk is set for the down-grade compared to the up-grade.

In addition, if the operation interval time Tk is set according to the acceleration/deceleration, in the same manner as the operation interval time Tk is set according to the gradient, the operation interval time 20 stored in the side support information storage part 19 is utilized as a reference time and the reference time is corrected according to the acceleration/deceleration. For example, the acceleration/deceleration of the vehicle of when traveling along the first curve is detected, and a coefficient K2 corresponding to the acceleration/deceleration is acquired based on a previously-stored acceleration/deceleration-coefficient map. In the acceleration/deceleration-coefficient map, a positive coefficient that is less than "1" (for example, 0.8) is set for the deceleration and a positive coefficient that is equal to or more than "1" (for example, 1.5) is set for the acceleration. The coefficient K2 is set larger as the acceleration increases.

The navigation unit 10 reads out the operation interval time 20 stored in the side support information storage part 19. By multiplying the reference time Tst that the operation interval time 20 indicates by the acquired coefficient K2, the operation interval time Tk is calculated (i.e., Tk=K2·Tst). As a result, the operation interval time Tk is corrected to be short at the deceleration. That is, if the speed is likely to decrease, the necessity of holding by the side support parts 55 is likely to decrease; therefore, the operation interval time Tk can be set short. On the other hand, the operation interval time Tk is corrected to be long at the acceleration; therefore, if the speed is likely to increase, the operation interval time Tk is set long to maximize the possibility that the side support parts 55 are maintained at the hold position.

Or, as a method to set the operation interval time Tk according to the acceleration/deceleration, the operation interval time Tk may be directly acquired using an acceleration/deceleration-operation interval map based on the acquired acceleration/deceleration. In the acceleration/deceleration-operation interval map, the acceleration/deceleration and the operation interval time Tk are associated and set. A short operation interval time Tk is set for the deceleration compared to the acceleration. A long operation interval time Tk is set for the acceleration compared to the deceleration.

According to the second example, the following effects and the like are produced in addition to the effects of (1) to (3) of the first example.

(4) In the second example, the operation interval time Tk is set according to the gradient information corresponding to the between-curves section and it is determined whether or not the required time Tr is less than the predetermined time including the start operation time, the termination operation time, and the operation interval time. Consequently, the operation interval time Tk can be the time according to the gradient; therefore, it is possible to more surely inhibit the hurried feeling that is given by the operation of the side support parts 55.

(5) In the second example, the operation interval time Tk is set according to the acceleration/deceleration predicted in the between-curves section and it is determined whether or not the required time Tr is less than the predetermined time including the start operation time, the termination operation time, and the operation interval time Tk. Consequently, the operation interval time Tk can be the time according to the acceleration/deceleration; therefore, it is possible to more surely inhibit the hurried feeling that is given by the operation of the side support parts 55.

III. Third Example

Next, a third example is described. In the this example, only a part of the processing of the first example and the second example is changed. Therefore, detailed explanation for the other parts is omitted.

In the present example, without using the above start operation time 21 and the termination operation time 22 set to constant values, the start operation time Ts and the termination operation time Te are calculated by dividing a support stroke by a movement speed of the side support parts 55. The support stroke represents a movement volume (a movement distance) of the side support parts 55.

In addition, in the present example, the hold position where the side support parts 55 are arranged is changed according to the lateral acceleration predicted for a curve ahead. If the predicted lateral acceleration is large, the support force of the side support parts 55 is enlarged to strongly support the upper body of the occupant. If the predicted lateral acceleration is small, the support force of the side support parts 55 is reduced.

Further, in the present example, the occupant can set the open position (an initial position) of the side support parts 55. The open position that the occupant can set is a position included in a range from a maximum open position that is far external side to an arbitrary position contacting the upper body of the occupant.

In this case, the position of the side support parts 55 of when traveling along the first curve depends on the curvature radius of the curve. Consequently, in calculating the termination operation time Te, a support stroke ST from the hold position (the action position) of the side support parts 55 for the first curve to the open position set by the occupant is acquired as follows.

Support stroke $ST$=Current hold position−Open position set by occupant

Next, the movement speed of the side support parts 55 Vss is acquired. The speed of the side support parts 55 Vss is acquired with a reference actuator speed Vac and a voltage supply gain of the side support drive mechanism 32 Gss.

Movement speed of side support parts $Vss$=Actuator speed $Vac$·Voltage supply gain $Gss$.

Further, the termination operation time Te is acquired by dividing the support stroke ST by the movement speed of the side support parts 55 Vss.

Termination operation time $Te$=Support stroke $ST$/Movement speed of side support parts $Vss$.

In addition, in calculating the start operation time Ts, the target hold position (the action position) of the side support parts 55 for the second curve is calculated and the support stroke ST when moving from the open position to the target position is calculated.

Support stroke $ST$=Target hold position−Open position set by occupant

Further, the start operation time Ts is calculated by dividing the support stroke ST by the movement speed of the side support parts 55 Vss.

Start operation time $Ts$=Support stroke $ST$ for next curve/Movement speed $Vss$ By making the start operation time Ts and the termination operation time Te changeable in this manner, even when the side support drive mechanism 32 that can arrange the hold position of the side support parts 55 at a plurality of positions is utilized, it is possible to inhibit the hurried feeling that is given by the operation of the side support parts 55. In addition, it is possible to surely arrange the side support parts 55 at the hold position just when the side support parts 55 should be arranged at the hold position. Consequently, the usability of the seat control system 1 can be enhanced.

According to the third example, the following effects and the like are produced in addition to the effects of (1) to (3) of the first example.

(6) In the third example, the hold position of the side support parts 55 for each curve ahead is calculated. In addition, the termination operation time Te is set as the time from the hold position of the side support parts 55 set for the first curve to the open position set by the occupant. The start operation time Ts is set as the time from such open position to the hold position of the side support parts 55 set for the second curve. Therefore, for example, even for the side support drive mechanism 32 that changes the hold position according to the curve, it is possible to properly calculate the termination operation time Te and the start operation time Ts according to the conditions at that moment.

In addition, the above respective examples may be changed as follows.

In the above respective examples, the curves in the predetermined range ahead of the vehicle are detected. However, if the destination is set, the curves on the route from the current position to the destination may be detected.

In the above respective examples, the start mark point and the end mark point are determined by converting the road shape S to the curvature variation line C and the curvature variation line C to the lateral acceleration curve A. However, methods other than the above may be utilized. For example, based on the road shape data, the curvature radius may be calculated towards shape interpolating points (or nodes) ahead of the vehicle, the lateral acceleration may be calculated according to the curvature radius, and it may be determined whether or not the lateral acceleration corresponds to the start mark point or the end mark point.

In the above respective examples, the required time Tr is calculated by dividing the distance Les between the end mark point for the first curve and the start point Gl1 for the second curve by the vehicle speed V. However, the required time may be calculated in another method. For example, the required time may be calculated using a legal speed or a design speed included in the road network data 16. Or, the required time Tr may be calculated by referring to a table in which the distance and the required time are associated.

In the above respective examples, whether or not to maintain the side support parts 55 at the hold position is determined by whether or not the required time Tr of when traveling between curves is less than the total time Tt acquired by adding the start operation time Ts, the termination operation time Te, and the operation interval time Tk. Or, it may be determined whether or not the required time Tr is equal to or more than a total time of the start operation time Ts, the termination operation time Te, and the operation interval time Tk. In this manner, it is possible to inhibit a case in which the start operation does not start when the start target point PS has been arrived.

In the first example and the second example, the side support parts 55 are arranged at the hold position or the open position. However, the hold position may be changeable according to the curvature radius of the curve or the like. For example, if the curvature radius of the curve is relatively small, the hold position is set to the position at which a large support force can be provided. If the curvature radius of the curve is relatively large, the hold position is set to the position at which a small support force can be provided. When it is determined to move the side support parts 55 from the hold position between curves, the side support parts 55 may be arranged not at the position at which the opening becomes the largest but between the position at which the opening becomes the largest and the hold position. Or, when it is determined to move the side support parts 55 from the hold position between curves, the position of the side support parts 55 may be changed according to the required time Tr. For example, if the required time Tr is relatively long, the side support parts 55 are arranged at the position at which the opening is large. In this manner, it is also possible to inhibit the hurried feeling that is given to the occupant.

In the second example, the operation interval time Tk is set according to the gradient information or the acceleration/deceleration. However, the operation interval time Tk may be set according to both the gradient information and the acceleration/deceleration. For example, the operation interval time Tk may be calculated by multiplying the reference time Tst by the coefficient K1 based on the gradient information and the coefficient K2 based on the acceleration/deceleration (Tk=K2·K1·Tst). Or, the coefficient corresponding to the gradient and the acceleration/deceleration may be acquired based on a previously stored gradient-acceleration/deceleration-coefficient map and multiplied by the reference time Tst. In this manner, it is also possible to properly set the operation interval time Tk.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A seat control device for controlling a seat drive mechanism that drives side support parts of a seat, the seat control device comprising:
a controller that:
detects a first curve ahead of a vehicle and a second curve located ahead of the first curve with respect to a travel direction;
predicts a between-curves time required to travel between the first curve and the second curve;
acquires an operation interval time previously set by an occupant;
determines whether the between-curves time is less than a predetermined time, the predetermined time being no less than a total of a time necessary for the side support parts to operate and the operation interval time;
controls the seat drive mechanism to arrange the side support parts at an action position to support a body of an occupant for the first curve; and
if the between-curves time is less than the predetermined time, maintains the side support parts at the action position while traveling the second curve.

2. The seat control device according to claim 1, wherein:
the controller:
acquires gradient information relating to a gradient between the first curve and the second curve; and
acquires an operation interval time set according to the gradient information; and
the predetermined time is no less than the total of the operation necessary time and the operation interval time.

3. The seat control device according to claim 1, wherein:
the controller:
acquires an acceleration or deceleration predicted between the first curve and the second curve;
wherein the operation interval time is set according to the acceleration or deceleration.

4. The seat control device according to claim 1, wherein the controller:
for each of the first and second curve:
predicts a lateral acceleration of traveling along the curve based on road information;

determines a start mark point to start driving the side support parts toward the action position based on a first point where the lateral acceleration becomes equal to or more than a first reference value; and determines an end mark point to start driving the side support parts from the action position based on a second point where the lateral acceleration becomes equal to or less than a second reference value;

acquires a distance between the end mark point of the first curve and the start mark point of the second curve; and calculates the between-curves time based on the acquired distance and a vehicle speed.

5. The seat control device according to claim 1, wherein the controller:

acquires the action positions of the side support parts set for the first curve and the second curve; and calculates the operation necessary time by adding a time required to move between the action position for the first curve and an initial position of the side support parts and a time required to move from the initial position to the action position for the second curve.

6. The seat control device according to claim 1, wherein the seat control device is included in a navigation device.

7. A seat control method for controlling a seat drive mechanism that drives side support parts of a seat, the method comprising:

detecting a first curve ahead of a vehicle and a second curve located ahead of the first curve with respect to a travel direction;

predicting a between-curves time required to travel between the first curve and the second curve;

acquiring an operation interval time previously set by an occupant;

determining whether the between-curves time is less than a predetermined time, the predetermined time being no less than a total of a time necessary for the side support parts to operate and the operation interval time;

controlling the seat drive mechanism with a controller, to arrange the side support parts at an action position to support a body of an occupant for the first curve, the controller being in operative communication with the seat drive mechanism; and if the between-curves time is less than the predetermined time, maintaining the side support parts at the action position while traveling the second curve.

8. The seat control method according to claim 7, wherein: the method further comprises:

acquiring gradient information relating to a gradient between the first curve and the second curve; and acquiring an operation interval time set according to the gradient information; and the predetermined time is no less than the total of the operation necessary time and the operation interval time.

9. The seat control method according to claim 7, wherein: the method further comprises:

acquiring an acceleration or deceleration predicted between the first curve and the second curve;

wherein the operation interval time is set according to the acceleration or deceleration.

10. The seat control method according to claim 7, further comprising:

for each of the first and second curve:

predicting a lateral acceleration of traveling along the curve based on road information;

determining a start mark point to start driving the side support parts toward the action position based on a first point where the lateral acceleration becomes equal to or more than a first reference value; and determining an end mark point to start driving the side support parts from the action position based on a second point where the lateral acceleration becomes equal to or less than a second reference value;

acquiring a distance between the end mark point of the first curve and the start mark point of the second curve; and calculating the between-curves time based on the acquired distance and a vehicle speed.

11. The seat control method according to claim 7, further comprising:

acquiring the action positions of the side support parts set for the first curve and the second curve; and calculating the operation necessary time by adding a time required to move between the action position for the first curve and an initial position of the side support parts and a time required to move from the initial position to the action position for the second curve.

12. The seat control method according to claim 7, wherein each step of the method is implemented by a controller.

13. A non-transitory computer-readable storage medium storing a computer-executable program for controlling a seat drive mechanism that drives side support parts of a seat, the program comprising:

instructions for detecting a first curve ahead of a vehicle and a second curve located ahead of the first curve with respect to a travel direction;

instructions for predicting a between-curves time required to travel between the first curve and the second curve;

instructions for acquiring an operation interval time previously set by an occupant;

instructions for determining whether the between-curves time is less than a predetermined time, the predetermined time being no less than a total of a time necessary for the side support parts to operate and the operation interval time;

instructions for controlling the seat drive mechanism to arrange the side support parts at an action position to support a body of an occupant for the first curve; and instructions for maintaining, if the between-curves time is less than the predetermined time, the side support parts at the action position while traveling the second curve.

* * * * *